United States Patent [19]
Howell

[11] 3,986,848
[45] Oct. 19, 1976

[54] GAS REHEATING SYSTEM USING HOT PRECIPITATOR

[75] Inventor: Brooks Mason Howell, East Granby, Conn.

[73] Assignee: Combustion Engineering, Inc., Windsor, Conn.

[22] Filed: Dec. 22, 1975

[21] Appl. No.: 643,275

[52] U.S. Cl. .................................... 55/7; 55/9; 55/11; 55/80; 55/84; 55/122; 55/125; 55/135; 55/224; 55/267; 55/315; 55/342; 55/470; 110/119; 122/DIG. 1

[51] Int. Cl.² ............... B01D 46/00; B01D 53/00; C10K 1/02; B03C 3/04

[58] Field of Search ............... 55/4, 7, 9, 11, 20, 55/80, 84, 106, 124, 122, 125, 135, 126, 217, 224, 267, 309, 315, 342, 470; 110/119; 122/DIG. 1

[56] References Cited
UNITED STATES PATENTS

| | | | |
|---|---|---|---|
| 1,329,859 | 2/1920 | Schmidt et al. | 55/135 X |
| 2,696,892 | 12/1954 | Campbell | 55/224 X |
| 2,706,533 | 4/1955 | Hedberg et al. | 55/135 X |
| 2,729,301 | 1/1956 | Ekstrom, Jr. | 110/119 |
| 2,883,173 | 4/1959 | Laboulais | 55/267 X |
| 3,372,528 | 3/1968 | Hoff | 55/135 X |
| 3,456,709 | 7/1969 | Vegeby | 55/122 X |
| 3,581,463 | 6/1971 | Roberts | 55/135 X |
| 3,670,669 | 6/1972 | Hoad | 110/119 X |

FOREIGN PATENTS OR APPLICATIONS

| | | | |
|---|---|---|---|
| 157,810 | 1/1921 | United Kingdom | 55/267 |

Primary Examiner—Frank W. Lutter
Assistant Examiner—Kathleen J. Prunner

[57] ABSTRACT

A gas handling and cleaning system for the combustion gases of a coal-fired steam generator comprises an electrostatic precipitator which receives the combustion gases from the steam generator, a preheater downstream of the electrostatic precipitator and a wet scrubber intermediately positioned between the preheater and the stack. The temperature and humidity of the gases entering the stack are controlled by conveying regulated quantities of the gases from the exit of both the precipitator and the preheater to a location intermediate the scrubber and the stack.

5 Claims, 1 Drawing Figure

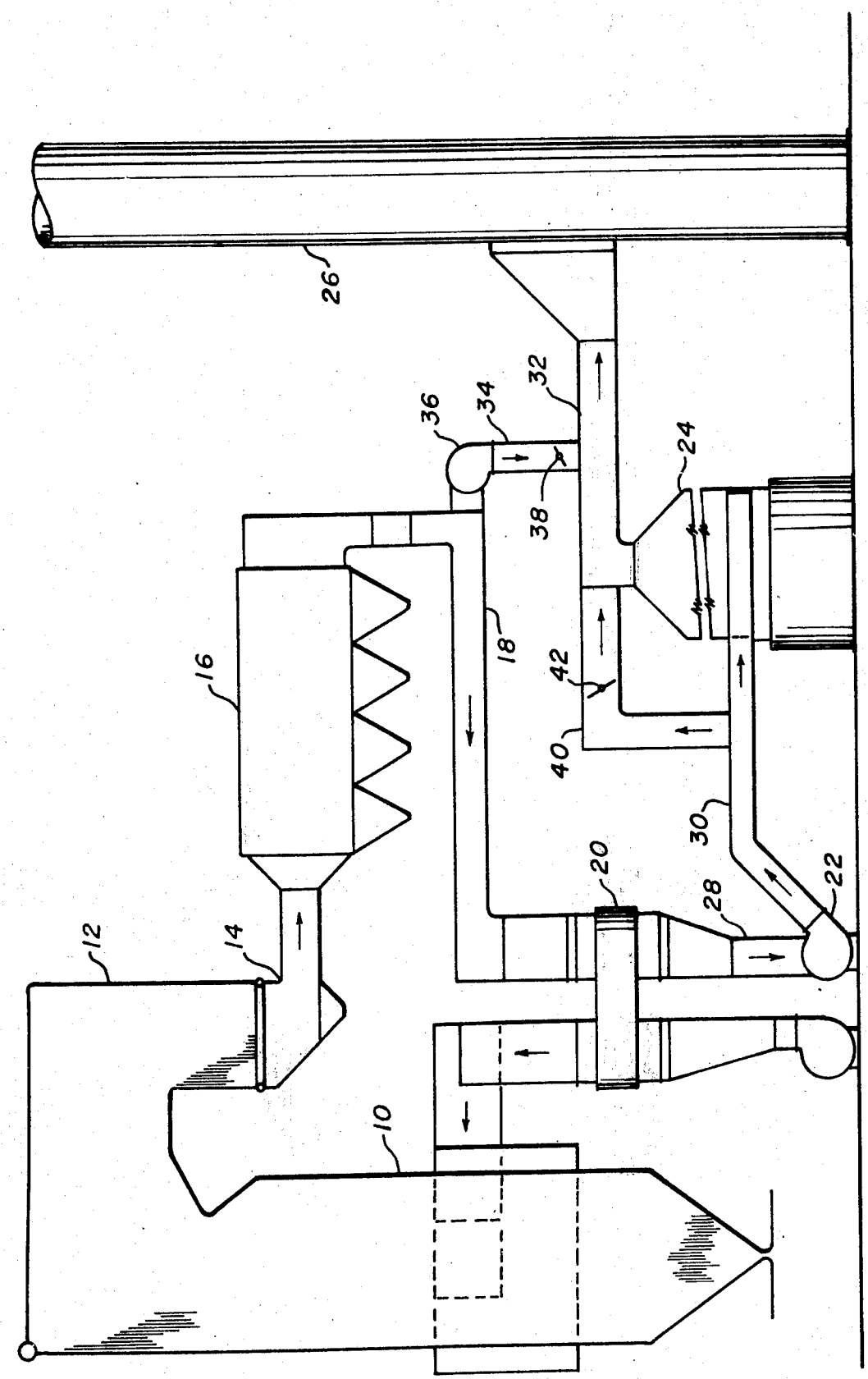

GAS REHEATING SYSTEM USING HOT PRECIPITATOR

BACKGROUND OF THE INVENTION

In power plant systems employing coal-fired steam generators it is known to employ various equipment to extract heat from the combustion gases leaving the steam generator and to employ various cleaning equipment to take the particulate matter and various undesirable gases out of the gas stream prior to discharging the same to atmosphere. One such system employs an air heater, an electrostatic precipitator and a wet scrubber with the electrostatic precipitator being downstream of the air heater in the direction of the combustion gas flow and with the wet scrubber in turn being downstream of the electrostatic precipitator. In such a system it is desirable that the temperature of the combustion gases exiting from the electrostatic precipitator and directed to the stack be at a predetermined minimum temperature in order that the gases will have a desired buoyancy and will, upon leaving the stack, continue to rise to a desired height. It is also desired that the gases exiting from the stack not have a plume of condensed vapor but that they be transparent such that the opacity of the gases can be monitored. Still another reason for maintaining a desired temperature of the gases as they enter the stack is to maintain condensation in the stack and the resulting deterioration of the stack at a minimum. Accordingly, various schemes for elevating the temperature of the gases leaving the scrubber have been suggested.

BRIEF DESCRIPTION OF THE INVENTION

In accordance with the present invention the disposition of the equipment in the system for handling the combustion gases is arranged such that a hot electrostatic precipitator is utilized. The precipitator is positioned intermediate the economizer or exit of the boiler and the inlet of the air heater. The combustion gases accordingly traverse first the electrostatic precipitator and then the air heater and thereafter the wet scrubber. With this arrangement the reheating of the gases exiting from the wet scrubber and being introduced into the stack can be accomplished by conveying controlled quantities of gas from the exit of the electrostatic precipitator and introducing the same into the gas stream prior to its being conveyed to the stack. Such an arrangement is acceptable where only partial treatment of the flue gases by the wet scrubber is needed to meet pollution control standards.

DESCRIPTION OF THE DRAWINGS

The single FIGURE of the drawing discloses, in diagrammatic form, a power plant system including a coal-fired steam generator and a combustion gas handling and cleaning arrangement.

DETAILED DESCRIPTION OF THE INVENTION

Referring now to the drawing there is disclosed therein a coal-fired steam generator 10 which includes adjacent its exit the usual economizer 12. Particulate laden combustion gases exit from the steam generator at the outlet 14 and are conveyed through the electrostatic precipitator 16 where substantially all of the particulate matter is removed. From the precipitator the gases traverse the duct 18 and are conveyed to and through the air heater 20. From this air heater the gases pass through the induced draft fan 22 and then the absorber 24 which is preferably in the form of a wet scrubber. From the absorber 24 the gases are conveyed to a suitable stack 26 with there being ducts 28, 30 and 32 provided to convey the combustion gases from the air heater through the absorber to the stack.

By locating the precipitator 16 in a hot gas zone there is produced at the outlet of the precipitator a stream of relatively high temperature gas such as approximately 750° F, which may be used for the purpose of reheating the gases exiting from the absorber 24 and entering the stack 26. It will be understood, of course, that the precipitator then must be structurally designed to operate in this higher temperature zone as compared with an arrangement where the precipitator is at the outlet of the air heater. Furthermore, the precipitator then must handle a larger volume of gas due to the elevated temperature of the gas.

In some instances it is necessary to only partially treat the flue gases in order to meet the pollution control standards. That is, only a portion of the flue gases need to be passed through the wet scrubber 24. An example of this would be when the control standards require that there be only a 64% sulfur dioxide removal. In such an instance, it would be possible to treat only 80% of the combustion gases in the scrubber removing essentially 80% of the sulfur dioxide in this 80% gas stream while bypassing the scrubber completely with 20% of the gas. Accordingly, in such an instance the combustion gas reheating arrangement of the present invention can advantageously be employed where high temperature combustion gases are conveyed from a location intermediate the precipitator 16 and the air heater 20 to a location intermediate the scrubber 24 and the stack 26. For this purpose there is provided a bypass duct 34 connected at its inlet with duct 18 and at its outlet with duct 32. Within duct 32 is mounted fan 36 and the regulating damper 38 which may be automatically or manually adjusted as desired.

Illustrative of the temperatures and conditions that may prevail, the gas exiting from the precipitator 16 may have 99% of its particulate matter removed and may be at a temperature in the range of 650°–800° F. Upon traversal of the air heater the gas temperature may be in a range of 250° to 350° F, and upon exiting from the absorber 24 the gas temperature may be between 115° and 135° F. It is desired that the relative humidity of the gases entering the stack be in a neighborhood of 50% and to achieve this the temperature may typically be between 145° and 165° F. It will thus generally be necessary to raise the temperature of the gases exiting from the absorber 24 prior to discharging the stream of gas into the stack 26. This is achieved with the present invention by regulating the quantity of high temperature gas passing though the bypass duct 34 from duct 18 to duct 32 with such regulation being achieved by means of the damper 38.

In addition to the bypass duct 34 there is provided a bypass 40 to bypass gas solely and immediately around the absorber 24. Located in this bypass is the regulation damper 42. The bypass 40 has the purpose of providing a tempering action when this may be desired. Since the gas traversing the bypass 34 bypasses the air heater 20, a greater efficiency may be obtained by utilizing both the bypass 34 and the bypass 40 in obtaining the desired elevation of the temperaure of the gas exiting from the absorber 24. Thus when it is possible, both bypass arrangements will be used to give the desired temperature elevation and obtain at the same time the desired removal of pollutants from the gas stream in the absorber 24 thereby giving the overall desired gas conditions both with respect to the constituents contained in the gas and the temperature.

There is thus provided with the present invention a system and a method whereby the temperature of the gases exiting from the absorber and entering the stack may be advantageously controlled in those instances where only partial treatment of the flue gases is needed to meet pollution control standards.

What is claimed is:

1. In combination with a coal-fired steam generator system a combustion gas handling and cleaning system including an electrostatic precipitator, an air heater, a wet scrubber, and a stack connected in series flow relation in the order named receiving the combustion gases from the discharge of the steam generator, means for bypassing a portion of the combustion gases from a location intermediate the electrostatic precipitator and the air heater to a location intermediate the scrubber and the stack and means for regulating the quantity of gases thus bypassed.

2. The system of claim 1 wherein the means for bypassing said combustion gases includes a bypass duct and a fan positioned in said duct for effecting the bypass of said gases to said duct and said means for regulating includes a damper positioned in said bypass duct.

3. The system of claim 2 including an induced draft fan intermediate the air heater and the wet scrubber.

4. The system of claim 3 including a bypass duct connected intermediate the induced draft fan and the scrubber and intermediate the scrubber and the stack to effectively bypass combustion gases around said scrubber, and means for regulating flow through said bypass duct.

5. In a power plant system utilizing a coal-fired steam generator and having a combustion gas handling system wherein the gas progressively traverses an electrostatic precipitator, an air heater, and a wet scrubber after which it is conveyed to a suitable stack, the method of controllably reheating the gases after they have passed through the wet scrubber and prior to being introduced into the stack by bypassing the air heater and the wet scrubber with a portion of the gases and regulating the portion thus bypassed whereby the hot gases upstream from the precipitator are introduced into the gas stream entering the stack to thereby raise the temperature of the same.

* * * * *